(No Model.)

P. W. TILLINGHAST.
PNEUMATIC TIRE AND WHEEL RIM.

No. 528,451. Patented Oct. 30, 1894.

Witnesses.
Robert Everett
Thos. A. Green

Inventor:
Pardon W. Tillinghast.
By Oscar Lapham
Atty.

THE NORRIS PETERS CO., PHOTO-LITHO., WASHINGTON, D. C.

UNITED STATES PATENT OFFICE.

PARDON W. TILLINGHAST, OF PROVIDENCE, RHODE ISLAND, ASSIGNOR TO THE TILLINGHAST MANUFACTURING COMPANY, OF SAME PLACE AND JERSEY CITY, NEW JERSEY.

PNEUMATIC TIRE AND WHEEL-RIM.

SPECIFICATION forming part of Letters Patent No. 528,451, dated October 30, 1894.

Application filed February 21, 1894. Serial No. 501,020. (No model.)

*To all whom it may concern:*

Be it known that I, PARDON W. TILLINGHAST, a citizen of the United States, residing at Providence, in the county of Providence and State of Rhode Island, have invented certain new and useful Improvements in Pneumatic Tires and Wheel-Rims, of which the following is a full, clear, and exact specification.

This invention relates to that type of pneumatic or air cushion tires which are slitted or divided at their inner sides, and have the edges of the slit provided with annular lips to engage properly shaped annular seats in or on the rim of a bicycle or other wheel.

The object of my invention is to improve the prior tires of this type, and provide novel means whereby the tire will be securely held and confined when inflated, the wheel rim can be simplified in construction, movable or contractible bands or parts on the wheel-rim are unnecessary, and the elements required to produce a strong, durable, and efficient tired wheel are materially simplified, and their manufacture economized, while enabling repairs to be conveniently and quickly effected by such means that an unskilled person can readily remove and replace the tire without the provision of special tools and appliances, and without disturbing any part of the wheel-rim.

To accomplish this object my invention consists in the features of construction and the combination or arrangement of devices hereinafter described and claimed, reference being made to the accompanying drawings, in which—

Figure 1:
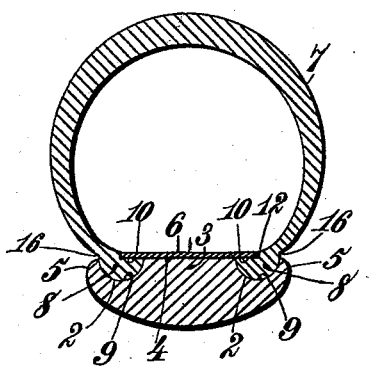
Figure 2:
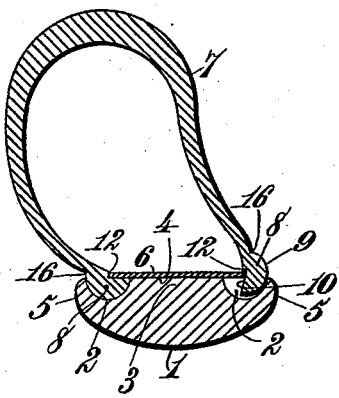
Figure 3:
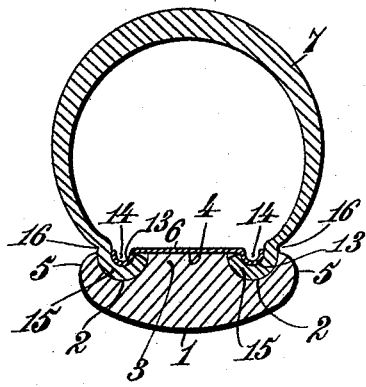

Figure 1 is a transverse sectional view of sufficient of a pneumatic or air cushion tire to illustrate my invention, the parts being in the position they occupy when the tire is inflated. Fig. 2 is a similar view indicating that the tire is collapsed and deflected for the purpose of detaching it from the wheel-rim, and Fig. 3 is a similar view showing a modification of the invention, the parts being in the position they occupy when the tire is inflated.

In order to enable those skilled in the art to make and use my invention, I will now describe the same in detail, referring to the drawings, wherein—

The numeral 1 indicates a wheel-rim which may be composed of wood, or any other material suitable for the conditions required. I prefer to employ wood, in that it provides a lighter wheel; and my invention enables a wooden rim to be used without special reinforcements to secure the proper strength.

The wheel-rim is provided with a pair of annular grooves 2, which are semi-circular in cross-section, or approximately so, and are separated from each other by an intervening bridge piece or annular rib 3 integral with the rim, and formed with a flat or flattened surface 4. The margins 5 of the rim are so constructed that they are substantially in the same plane as the flattened surface 4, and the latter constitutes a supporting seat or bearing for a flat annular metallic band 6, which is rigidly secured to the annular bridge-piece or rib in any suitable manner. The width of the annular metallic band 6 is considerably less than the width of the wheel-rim, and it is so applied to the bridge-piece or rib 3 that the edge portions of the metallic band extend about half way over the annular grooves 2, for the purpose of providing annular entering slots between the edges of the metallic band and the inner edge portions of the margins 5 of the rim.

The pneumatic or air cushion tire may be of any material suitable for the conditions required, and ordinarily it is composed of an external casing 7 made of canvas and rubber, or any other material suitable for the purpose in hand. The external casing is designed to inclose an air tube of ordinary construction, which air tube I do not deem it necessary to illustrate in the drawings. The external casing or covering is vulcanized and shaped into circular form, but is so divided at its inner side as to provide two opposite annular edge portions, designed to be connected with the wheel-rim, so that the tire can be readily removed and replaced. The edge portions of the casing or covering are each provided with an annular bead or thickened rib 8, having a rounded outer surface 9 to accurately fit one of the grooves 2, which grooves, as before stated, are semi-circular, or approximately so, in cross section. The beads or thickened portions 8 are formed at their inner sides with rabbets to provide flat faces 10 and lateral shoulders 12, the flat faces 10 being designed to bear against the under sides of the overhanging parts of the annular metallic band, while the lateral shoulders 12 are designed to bear directly against the edges of the said band. The beads or thickened ribs 8 are molded into permanent definite shape, and are vulcanized with the casing or covering, so that the said beads or thickened ribs will retain the configuration or shape above described and shown in the drawings. The molded and vulcanized ribs or beads 8 accurately fit the annular grooves 2, and the flat faces 10 and lateral shoulders 12 bear against those parts of the annular metallic band 6 which partially overlie or overhang the grooves 2, as clearly shown in Fig. 1. When the parts are in this position, and they can be readily placed in this position when the tire is collapsed, the said parts will be firmly and securely held to the wheel-rim when the tire is inflated and under pressure of confined air.

If the tire be collapsed it can be quickly and conveniently detached by deflecting it laterally, as shown in Fig. 2, whereby one of the ribs 8 will turn like a ball in a socket within the groove 2, and it can be withdrawn through the slot created between one edge of the band 6 and the inner edge of one of the margins 5 of the wheel-rim.

The tire can be readily replaced by introducing one of the beads or ribs 8 and turning it in a curved path until it accurately fits one of the grooves 2 and bears against the annular band, as before explained, whereupon the other bead or rib 8 can be introduced and seated in the same manner. The construction and arrangement are such that the width of the slots created between the edges of the band 6 and the margins 5 are each less than the width of a groove 2, and the form or shape of the beads 8 is such that while they can be readily introduced by moving in curved pathways like a ball turning in a socket, they cannot be withdrawn except by movements in the same curved pathways, so that when the tire is applied to the wheel rim, as explained, and the tire is inflated, it cannot possibly become disarranged or detached; while, if collapsed, it can be quickly and readily removed for the purpose of repairing it.

By constructing the wheel-rim with the annular grooves 2, semi-circular, or approximately so in cross section, and separated from each other to provide the intervening annular bridge-piece or rib 3, with its flattened surface, and rigidly securing the annular metallic band 6 to this bridge-piece or rib, I am able to construct the wheel-rim of wood without the necessity of employing reinforcing attachments, because much of the strain is supported by the annular metallic band 6 which is employed to co-operate with the wheel-rim in retaining the beads or thickened portions 8 in position.

It will be observed that the beads or thickened portions 8 accurately fill the grooves. This is important for the purpose of providing the necessary frictional contact to prevent the tire from creeping on the wheel-rim. The beads or thickened portions 8 are formed solid, but they are susceptible of being stretched longitudinally, or in the direction of their length, in order to render it possible to readily place them in the grooves when it is desired to attach the tires. In replacing the tire in operative connection with the wheel-rim it is essential that the beads or thickened portions be worked gradually into the semi-circular grooves, and to accomplish this in a practicable manner, the beads or thickened portions must be susceptible of slightly stretching as above mentioned.

In practice no leverage strain is placed directly upon the margins or rim edges 5, because the shoulder portions 12 lie above the margins or edges 5, and since these beads or thickened parts are molded and vulcanized into definite shape, they are stiff and will prevent the sides of the tire unduly pressing against the margin or edges 5, whereby liability of cutting or chafing the tire is avoided.

It will be observed that by the construction shown each bead 8 is stiff up to each corner or point 16 of the tire, and the rim edges 5 so terminate that they never touch the tire at or above the points 16, whereby cutting or chafing of the tire is effectually prevented, as above stated. The shoulders 12 are at the centers of the beads 8, or rather at the centers of the edges of the tire, and such beads or edges turn on the shoulders 12, as pivots in moving into and out of the grooves 2.

The construction of the wheel-rim and the arrangement of the annular metallic band places the space for the air tube wholly above the wheel-rim, thereby securing the best results by obtaining the full advantage of the cushion of air; and, furthermore, the construction is such that cement is entirely dispensed with for the purpose of securing the tire in position on the wheel-rim.

As shown in Figs. 1 and 2, the annular metallic band is perfectly plain and flat, but if desired the edge portions of the metallic band may each be struck up with an annular bead 13, formed by an annular depression 14, as shown in Fig. 3. In this construction, when the tire is applied and secured as shown, a dead air space will lie between the edges of the tire and the main body portion of the metallic band. In the modified construction the tire can be attached and detached in substantially the same manner as described with reference to Figs. 1 and 2.

In both forms of my invention the beads or thickened parts, which are semi-circular in cross-section and molded and vulcanized into definite shape at the edges of the casing or covering, can be only attached and detached by movements in circular pathways, like balls in sockets, and this is regarded as very important and advantageous.

My invention possesses the advantage of simplicity in construction and economy of manufacture, in that the number of parts necessary to make a strong, durable and practical tire are reduced to a minimum. The tire can be quickly and conveniently removed, thus rendering it possible to effect repairs with great facility, and the wheel-rim has no movable parts to become disarranged, while it will firmly hold the pneumatic tire in position when the tire is inflated.

The improved construction and arrangement are such that no leverage strain can be exerted by the sides of the tire on the edges of the wheel-rim, since the flat faces 10 constantly press against the under side of the band 6, while the rounded surfaces of the beads 8, accurately fit and bear against the walls of the grooves 2, thus bodily supporting the sides of the tire away from the edges of the wheel-rim.

The accurate fitting of the beads 8 and grooves 2 is important, in that the extended contact surfaces prevent creeping of the tire, and the beads fill the grooves and render it impossible for the air-tube to be pinched and injured or damaged, because the beads 8 cannot enter the grooves 2, if the air-tube is in or over the grooves.

Pneumatic tires have been constructed with thickened edges held in grooves of the wheel-rim by a clamping band, but in prior constructions ordinarily used, the clamping band is movable laterally, or is contractible circumferentially, thereby materially increasing the cost of manufacture. Furthermore, the laterally movable, or contractible band is objectionable, in that it is extremely liable to become disarranged. Pneumatic tires have also been attached to a wheel-rim having an inner bridge-piece; but in prior constructions the fastening depends on a clamping device for clamping the stiff edges or sides of the tire over the edges of the wheel-rim, which construction places great leverage strain on the rim edges and weakens the tire at that point. This leverage strain is so great that when a wood rim is employed it is usual to reinforce it with metal side pieces, which, in some cases, amount in effect to a complete metal rim on a wood base.

My improved construction requires no reinforcing of the wheel rim, since a portion of the strain is sustained by the annular metallic band rigidly secured to the wheel-rim.

Having thus described my invention, what I claim is—

1. The combination of a wheel-rim having a pair of annular grooves substantially semicircular in cross section, an annular band rigidly secured to the wheel-rim and extending partially over the said grooves, and a pneumatic tire having a pair of edges molded and vulcanized with stretchable beads having rounded outer surfaces to fit said grooves, substantially as described.

2. The combination of a wheel-rim having a pair of annular grooves substantially semicircular in cross section, an annular band secured to the periphery of the wheel-rim and having its edges provided with annular beads which overhang the annular grooves in the wheel-rim, and a slitted or divided tire having the edges of the slit or division molded and vulcanized with annular stretchable beads having rounded outer surfaces to fit the grooves and engaged with the said annular beads of the annular band, substantially as described.

In testimony whereof I have hereunto set my hand in presence of two subscribing witnesses.

PARDON W. TILLINGHAST.

Witnesses:
HENRY F. CAMPBELL,
BENJ. FRANKLIN, Jr.